US 7,930,328 B2

(12) United States Patent
Davis et al.

(10) Patent No.: US 7,930,328 B2
(45) Date of Patent: Apr. 19, 2011

(54) APPARATUS, SYSTEM, AND METHOD FOR FILE SYSTEM SHARING

(75) Inventors: Mark Charles Davis, Durham, NC (US); Joshua N. Novak, Wake Forest, NC (US); Rod D. Waltermann, Rougemont, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 442 days.

(21) Appl. No.: 12/059,843

(22) Filed: Mar. 31, 2008

(65) Prior Publication Data
US 2009/0249331 A1 Oct. 1, 2009

(51) Int. Cl.
*G06F 12/00* (2006.01)
*G06F 21/00* (2006.01)

(52) U.S. Cl. .......................................... 707/831; 711/6

(58) Field of Classification Search ................ 707/821, 707/822, 831; 711/162, 154, 137, 6, 100, 711/203; 726/27
See application file for complete search history.

(56) References Cited

U.S. PATENT DOCUMENTS

| 6,003,123 | A  | * | 12/1999 | Carter et al. ................. 711/207 |
| 6,463,509 | B1 | * | 10/2002 | Teoman et al. ............... 711/137 |
| 6,610,102 | B1 | * | 8/2003  | Aldred et al. ................ 715/234 |
| 6,883,074 | B2 | * | 4/2005  | Lee et al. ..................... 711/162 |
| 7,242,929 | B2 | * | 7/2007  | Draluk et al. ................ 455/419 |
| 2004/0117567 | A1 | * | 6/2004 | Lee et al. ..................... 711/154 |
| 2006/0265761 | A1 | * | 11/2006 | Rochette et al. .............. 726/27 |
| 2010/0023702 | A1 | * | 1/2010  | Landau et al. ................ 711/147 |

* cited by examiner

*Primary Examiner* — Hung T Vy
(74) *Attorney, Agent, or Firm* — Kunzler Needham Massey & Thorpe

(57) ABSTRACT

An apparatus, system, and method are disclosed for file system sharing. A Read-Only File System (ROFS) organization module organizes a single ROFS for a plurality of operating systems. Each operating system executes on a distinct virtual machine. Each virtual machine executes on a computer. A Read/Write File System (RWFS) organization module organizes an RWFS for each operating system. An access module accesses the RWFS and ROFS for each operating system. The RWFS and ROFS appear to each operating system as a single, private file system. Each RWFS comprises at least one pointer to the ROFS.

20 Claims, 7 Drawing Sheets

APPARATUS, SYSTEM, AND METHOD FOR FILE SYSTEM SHARING

BACKGROUND OF THE INVENTION

1. Field of the Invention

This invention relates to file systems and more particularly relates to file system sharing.

2. Description of the Related Art

Computers are often configured to run a plurality of operating systems. Executing the plurality of operating systems on a single computer allows the computer to perform more functions. For example, a single computer may execute a plurality of operating systems that each execute on a virtual machine of the computer. Each operating system may be used to perform a specific task such as hosting a website. In addition, the plurality of operating systems allows the use of special-purpose operating systems. For example, a special-purpose security operating system may run concurrently on a computer with a general-purpose operating system.

The computer may employ a hypervisor to manage the plurality of operating systems that each execute on the single computer. The hypervisor may load the context of each of the operating systems in turn so that each operating system may perform operations for slice of time. Each of the operating systems shares the processor, memory, and other resources of the computer in turn.

Each operating system typically includes a kernel, a file system, configuration data, and applications. The hypervisor may create a virtual machine for each of the operating systems. Thus while each operating system is executing, the operating system has access to the normal resources of the computer. However, some of the operating system contexts must concurrently be present on the computer. Thus, many copies of kernels, file systems, configuration data, and applications may be stored in the memory.

For example, each of the operating systems may have a file system stored in memory. However, each of the file systems may by itself user significant quantity of memory. As a result, the memory requirements for computers executing a plurality of operating systems are often significant.

SUMMARY OF THE INVENTION

From the foregoing discussion, there is a need for an apparatus, system, and method that share file systems. Beneficially, such an apparatus, system, and method would allow memory to be shared among a plurality of file systems.

The present invention has been developed in response to the present state of the art, and in particular, in response to the problems and needs in the art that have not yet been fully solved by currently available file system methods. Accordingly, the present invention has been developed to provide an apparatus, system, and method for file system sharing that overcome many or all of the above-discussed shortcomings in the art.

The apparatus for file system sharing is provided with a plurality of modules configured to functionally execute the steps of organizing a single read-only file system (ROFS), organizing a read/write file system (RWFS), and accessing the RWFS and ROFS. These modules in the described embodiments include an ROFS organization module, an RWFS organization module, and an access module.

The ROFS organization module organizes a single ROFS for a plurality of operating systems. Each operating system executes on a distinct virtual machine. Each virtual machine executes on a computer. The RWFS organization module organizes an RWFS for each operating system.

The access module accesses the RWFS and ROFS for each operating system. The RWFS and ROFS appear to each operating system as a single, private file system. Each RWFS comprises at least one pointer to the ROFS.

A system of the present invention is also presented for file system sharing. The system may be embodied in a computer. In particular, the system, in one embodiment, includes a memory module and a processor module. The memory module stores software instructions and data. The processor module executes the software instructions and processes the data. The software instructions include a plurality of virtual machines, a plurality of operating systems, a hypervisor, a ROFS organization module, a RWFS organization module, and an access module.

Each operating system executes on a distinct virtual machine. The ROFS organization module organizes a single ROFS for the plurality of operating systems. The RWFS organization module organizes an RWFS for each operating system.

The access module accesses the RWFS and ROFS for each operating system. The RWFS and ROFS appear to each operating system as a single, private file system. Each RWFS comprises one or more pointers to the ROFS.

A method of the present invention is also presented for sharing file systems. The method in the disclosed embodiments substantially includes the steps to carry out the functions presented above with respect to the operation of the described apparatus and system. In one embodiment, the method includes organizing a single ROFS, organizing a RWFS, and accessing the RWFS and ROFS.

An ROFS organization module organizes a single ROFS for a plurality of operating systems. Each operating system executes on a distinct virtual machine. Each virtual machine executes on a computer. An RWFS organization module organizes an RWFS for each operating system.

An access module accesses the RWFS and ROFS for each operating system. The RWFS and ROFS appear to each operating system as a single, private file system. Each RWFS contains at least one pointer to the ROFS.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention shares an ROFS between multiple operating systems. In addition, the present invention may reduce the memory requirements for the file systems of the multiple operating systems. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
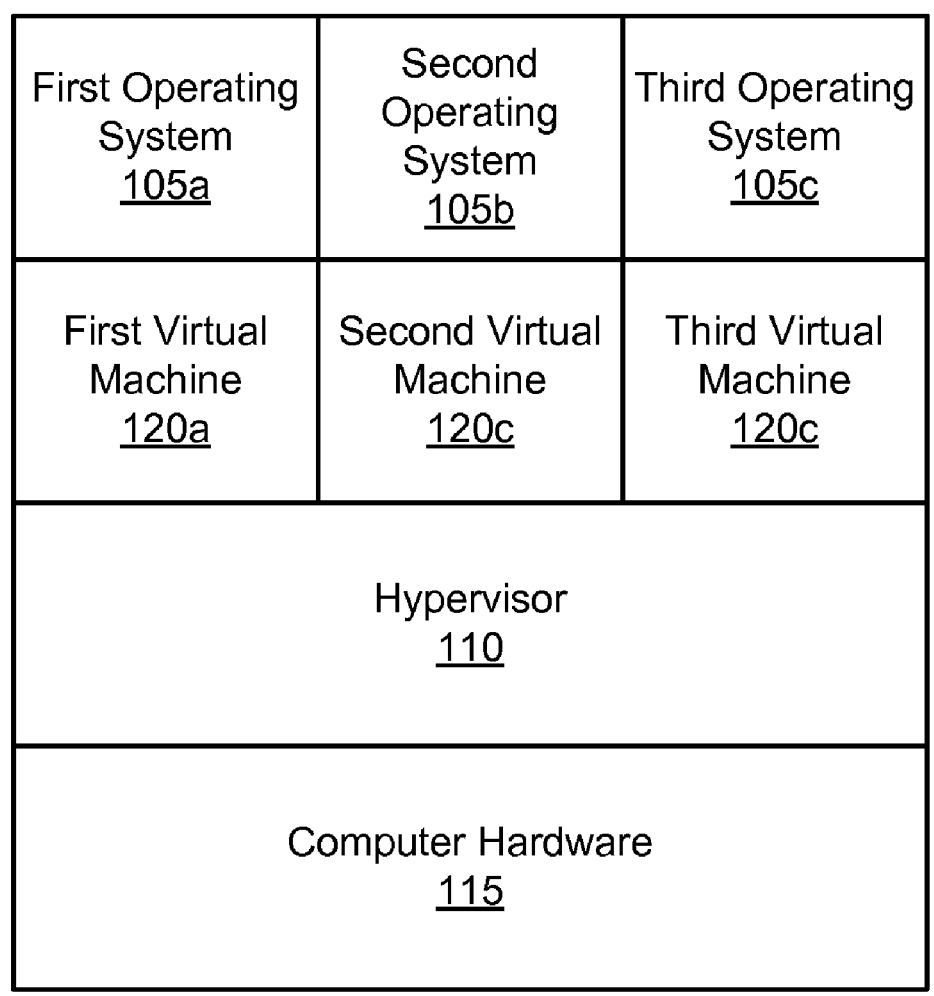
FIG. 1 is a schematic block diagram illustrating one embodiment of a computer system in accordance with the present invention.

FIG. 1 is a schematic block diagram illustrating one embodiment of a computer system 100 in accordance with the present invention. The system 100 includes one or more operating systems 105, one or more virtual machines 120, a hypervisor 110, and computer hardware 115. Although the system 100 is shown with three operating systems 105 and virtual machines 120, any a number of operating systems 105 and virtual machines 120 may be employed.

The computer hardware 115 executes computer program products. The computer program products may include a tangible storage device such as a hard disk drive and/or a Random Access Memory (RAM). The tangible storage device may include one or more computer readable programs. Each computer readable program may include software instructions and data as is well known to those of skill in the art. The computer hardware 115 will be described in more detail hereafter.

The hypervisor 110 executes on the computer hardware 115. In addition, the hypervisor 110 manages the execution of the operating systems 105 on the computer hardware 115. In one embodiment, the hypervisor 110 includes a kernel. Alternatively, the hypervisor 110 executes under one of the operating systems 105.

In one embodiment, each operating system 105 executes on a virtual machine 120. Each virtual machine 120 may appear as dedicated computer hardware to the operating system 105 as is well known to those of skill in the art.

In one embodiment, the hypervisor 110 manages context switching between the operating systems 105. For example, the hypervisor 110 may stop the execution of the first operating system 105a on the first virtual machine 120a and the underlying computer hardware 115. The hypervisor 110 may then save the context of the first operating system 105a to a memory and/or hard disk drive. In addition, the hypervisor 110 may load the context of a second operating system 105b from the memory and/or hard disk drive. The hypervisor 110 may further initiate the continued execution of the second operating system 105b on the second virtual machine 120b and underlying computer hardware 115.

Thus a plurality of operating systems 105 may all executed on the computer hardware 115. In one embodiment, the first operating system 105a is a general-purpose operating system 105 while the second operating system 105b and a third operating system 105c may be special-purpose operating systems 105. For example, the second operating system 105b may perform specialized security operations. In addition, the third operating system 105c may mirror a hard disk drive to a backup storage system.

Alternatively, each of the operating systems 105 may be general-purpose operating systems 105. For example, the first, second, and third operating system's 105a-c may each function as a virtual server. Each operating system 105a-c may then be configured with the unique security configuration, performance parameters, and the like. Thus the underlying computer hardware 115 may cost effectively perform multiple functions.

In one embodiment, at least two of the operating systems 105 are loaded from the same image. For example, the first and second operating systems 105a-b may be Linux operating systems 105 that are loaded from the same image. In a certain embodiment, the at least two operating systems 105 may share a read-only kernel.

Alternatively, at least two of the operating systems 105 may be distinct. For example, the first operating system 105a may be a Linux operating system while the third operating system 105c may be a WINDOWS® operating system.

Figure 2:
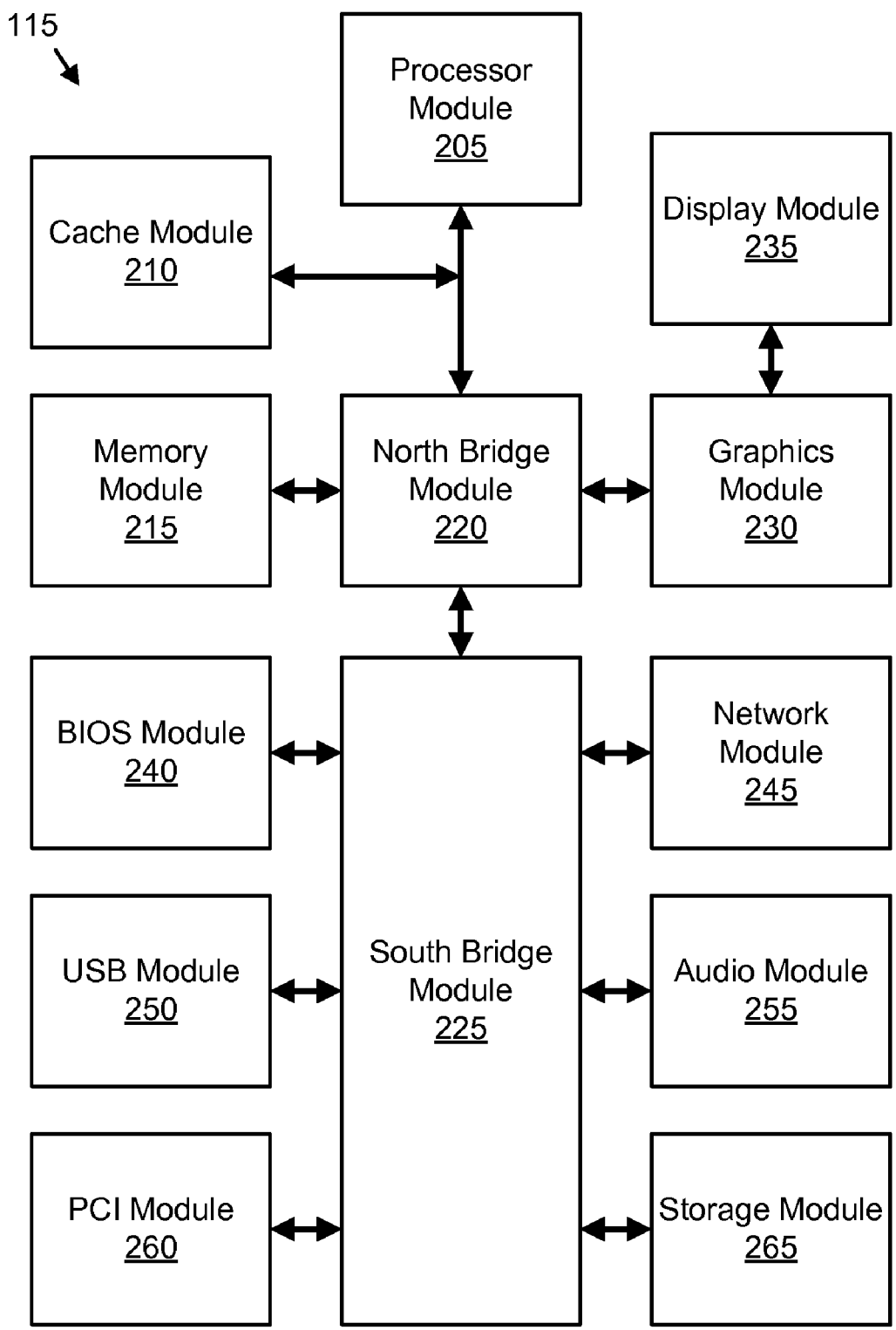
FIG. 2 is a schematic block diagram illustrating one embodiment of computer hardware of the present invention.

FIG. 2 is a schematic block diagram illustrating one embodiment of computer hardware 115 of the present invention. The description of the computer hardware 115 refers to elements of FIG. 1, like numbers referring to like elements. The computer hardware 115 includes a processor module 205, a cache module 210, a memory module 215, N Ad a north bridge module 220, a south bridge module 225, a graphics module 230, a display module 235, a basic input/output system ("BIOS") module 240, a network module 245, a peripheral component interconnect ("PCI") module 260, and a storage module 265.

The processor module 205, cache module 210, memory module 215, north bridge module 220, south bridge module 225, graphics module 230, display module 235, BIOS module 240, network module 245, PCI module 260, and storage module 265, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 215 stores software instructions and data. The processor module 205 executes the software instructions and manipulates the data as is well known to those skilled in the art. The software instructions and data may be configured as one or more computer readable programs. The computer readable programs may be tangibly stored in the storage module 265. The storage module 265 may be a hard disk drive, an optical storage device, a holographic storage device, a micromechanical storage device, a semiconductor storage device, or the like. Alternatively, the computer readable programs may be tangibly stored in the memory module 215. The memory module 215 may include Random Access Memory (RAM).

The processor module 205 may communicate with the cache module 210 through a processor interface bus to reduce the average time to access memory module 215. The cache module 210 may store copies of the data from the most frequently used memory module 215 locations. The computer hardware 115 may use one or more cache modules 210 such as a DDR2 cache memory or the like.

The north bridge module 220 may communicate with and provide bridging functionality between the processor module 205, the graphic module 230, the memory module 215, and the cache module 210. The processor module 205 may be connected to the north bridge module 220 over a, for example, six hundred sixty seven Megahertz (667 MHz) front side bus.

The north bridge module 220 may be connected to the south bridge module 225 through a direct media interface (DMI) bus. The DMI bus may provide a high-speed, bi-directional, point-to-point link supporting a clock rate for example of one Gigabytes per second (1 GBps) in each direction between the north bridge module 220 and the south bridge module 225. The south bridge module 225 may support and communicate with the BIOS module 240, the network module 245, the PCI module 260, and the storage module 265.

The PCI module 260 may communicate with the south bridge module 225 for transferring data or power to peripheral devices. The PCI module 260 may include a PCI bus for attaching the peripheral devices. The PCI bus can logically connect several peripheral devices over the same set of connections. The peripherals may be selected from a printer, a joystick, a scanner, or the like. The PCI module 260 may also be an expansion card as is well known to those skilled in the art.

The BIOS module 240 may communicate instructions through the south bridge module 225 to boot the computer hardware 115, so that software instructions stored on the storage module 265 can load, execute, and assume control of the computer hardware 115. Alternatively, the BIOS module 240 may comprise a coded program embedded on a chipset that recognizes and controls various devices that make up the computer hardware 115.

The network module 245 may communicate with the south bridge module 225 to allow the computer hardware 115 to communicate with other devices over a network. The devices may include routers, bridges, computers, printers, and the like.

The display module 225 may communicate with the graphic module 230 to display the topological display of the user interface elements as will be described hereafter. The display module 235 may be a cathode ray tube (CRT), a liquid crystal display (LCD) monitor, or the like.

Figure 3:
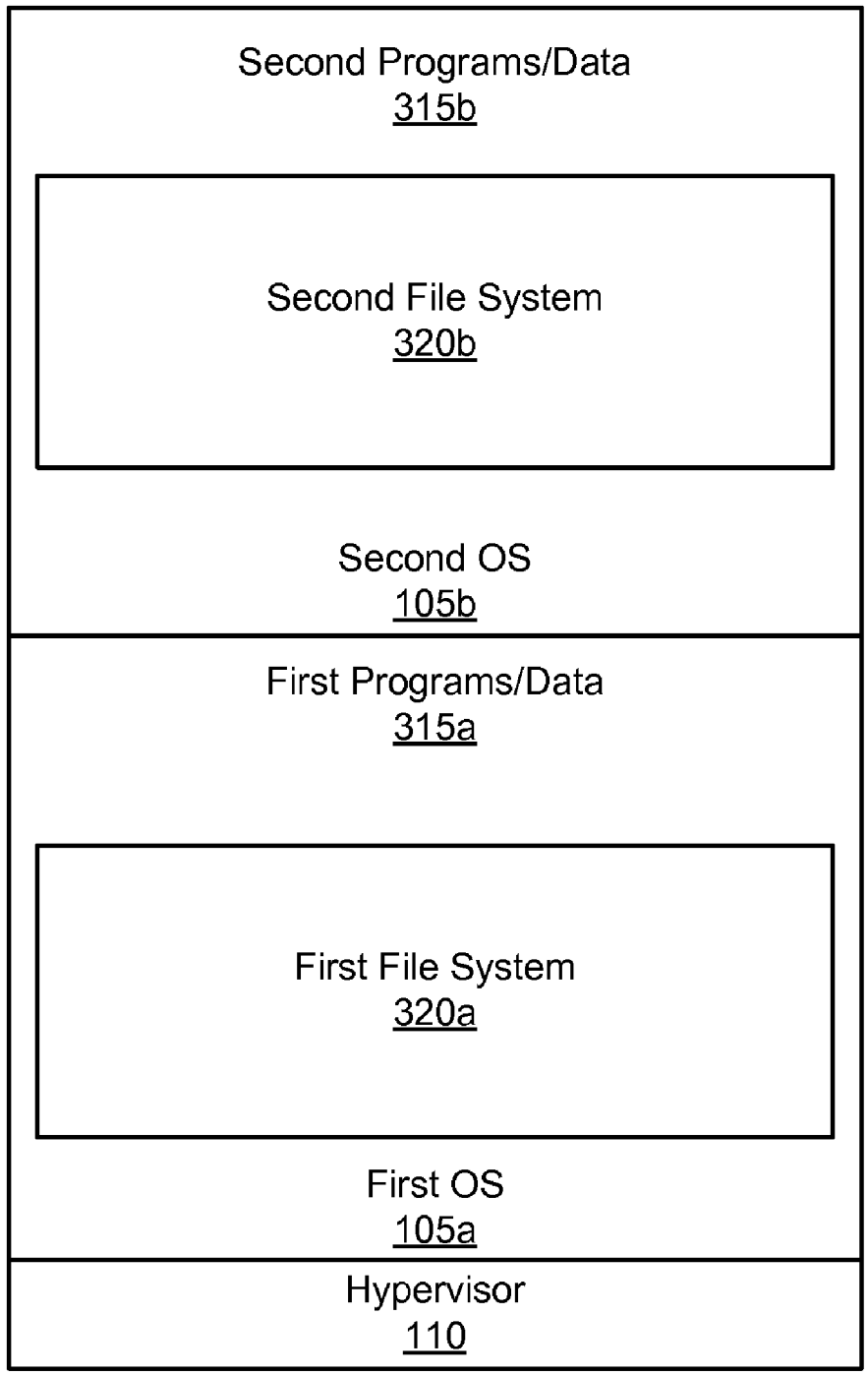
FIG. 3 is a schematic block diagram illustrating one embodiment of a memory map.

FIG. 3 is a schematic block diagram illustrating one embodiment of a memory map 300. The description of the memory map 300 refers to elements of FIGS. 1-2, like numbers referring to like elements. The memory map 300 includes the hypervisor 110, the first operating system 105a, and a second operating system 105b. For simplicity only the first and second operating systems 105a-b of FIG. 1 are shown.

In one embodiment, the memory map 300 represents software instructions and data stored in the memory module 215 of FIG. 2. For example, a hypervisor 110 and operating systems 105 may be booted on the computer hardware 115 by loading the software instructions and data of the memory map 300 from the storage module 265 to the memory module 215. The hypervisor 110, the first operating system 105a, and second operating system 105b may each be stored in blocks of memory in the memory module 215. The processor module 205 may then execute the software instructions and employ the data of the memory map 300 under the management of a hypervisor 110.

The hypervisor 110 and the first and second operating systems 105a-b comprise software instructions and data. In addition, programs/data 315 used by each operating system 105 may be stored contiguous to the operating system 105 in the memory module 215. Alternatively, the programs/data 315 may be stored separately from the operating system 105.

In the past, each operating system 105a-b further included a discrete file system 320a-b as shown. For example, in the depicted embodiment, the first operating system 105a includes a first file system 320a while the second operating system 105b includes a second file system 320b.

Unfortunately, each of the file systems 320 may consume a significant portion of memory in the memory module 215. As a result, additional memory may be required for a memory module 215. Alternatively, software instructions and data that are stored in the memory module 215 may be repeatedly transferred between the memory module 215 and the storage module 265, degrading the performance of the computer hardware 115 and the operating systems 105.

The present invention allows sharing a file system between operating systems 105 as will be described hereafter. By sharing file systems, the present invention supports the execution of multiple operating systems 105 on the computer hardware 115 with reduced memory requirements.

Figure 4:
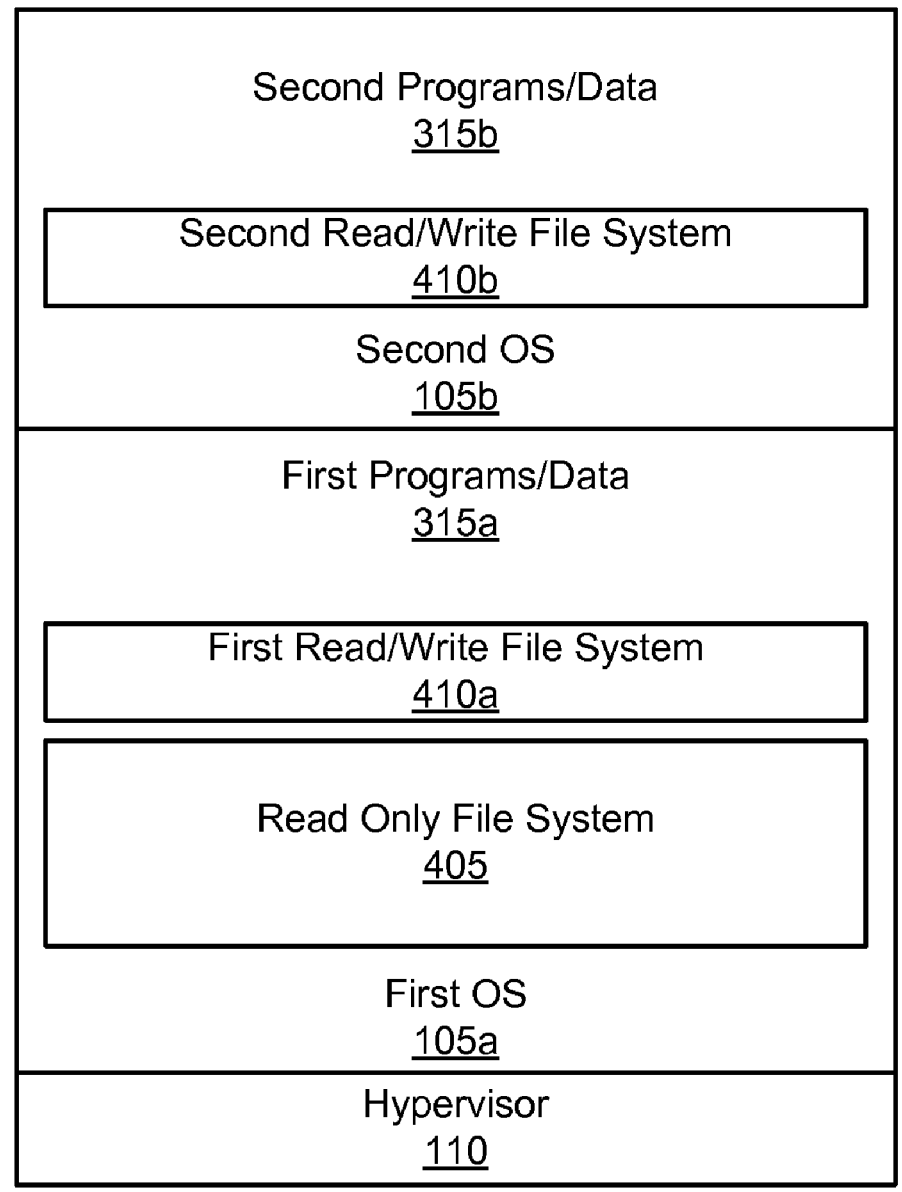
FIG. 4 is a schematic block diagram illustrating one embodiment of a memory map of the present invention.

FIG. 4 is a schematic block diagram illustrating one embodiment of memory map 400 in memory of the present invention. The description of the memory map 400 refers to elements of FIGS. 1-3, like numbers referring to like elements. The memory map 400 shows the storage of the hypervisor 110, the first operating system 105a, and the second operating system 105b in the memory module 215. Although for simplicity the memory map 400 is described for two operating systems 105a-b, the present invention may be practiced using any number of operating systems 105.

The first operating system 105a includes an ROFS 405 and a first RWFS 410a. In addition, the first operating system 105a uses both the ROFS 405 and the first RWFS 410a as a file system as will be described hereafter. The second operating system 105b includes only a second RWFS 410b. However, the second operating system 105b employs both the ROFS 405 and the second RWFS 410b as a file system. Thus both the first and second operating systems 105a-b share the ROFS 405. Sharing the ROFS 405 results in significant savings in the memory space of the memory module 215 required by the operating systems 105.

Figure 5:
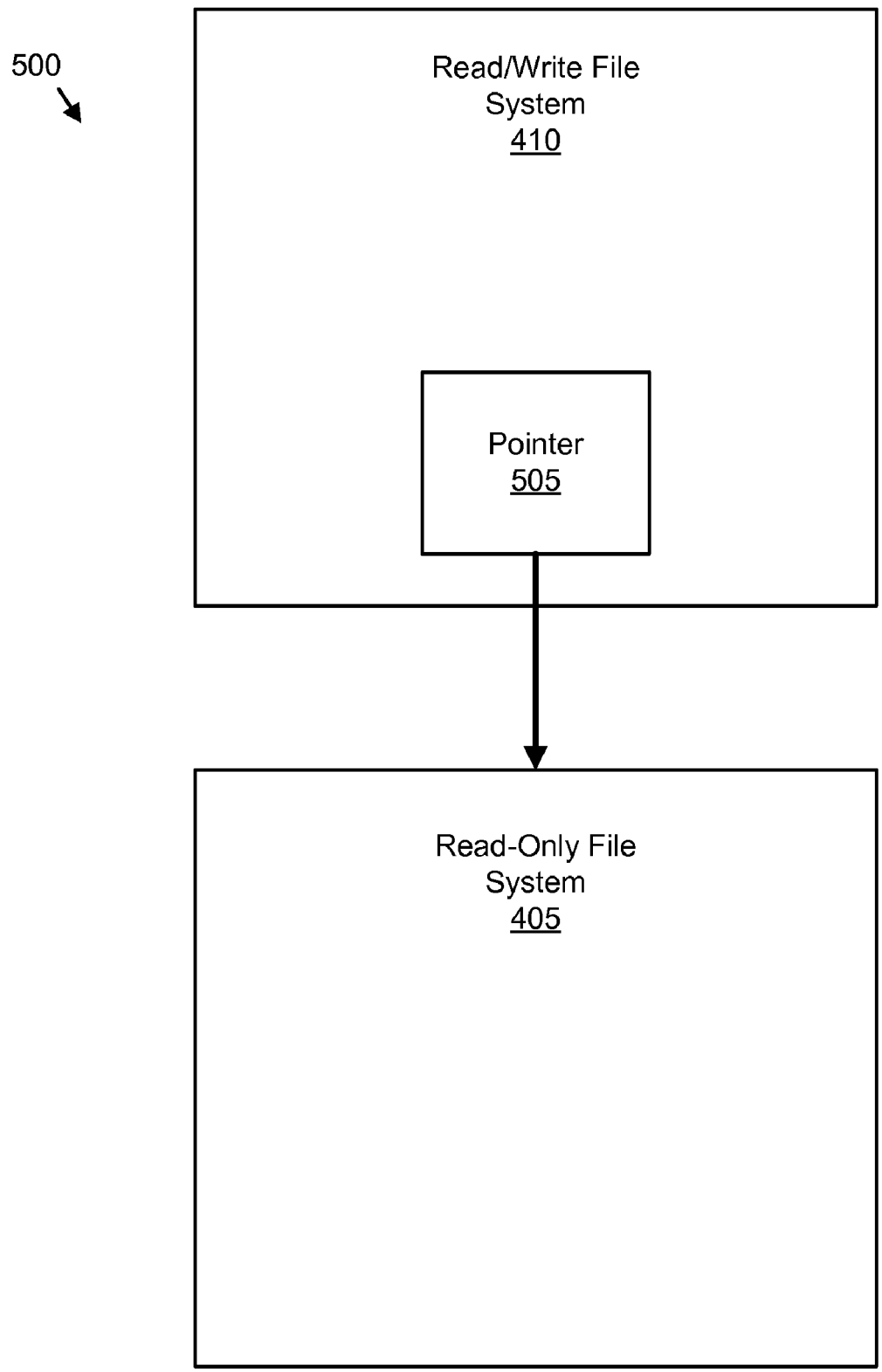
FIG. 5 is a schematic block diagram illustrating one embodiment of file systems of the present invention.

FIG. 5 is schematic block diagram illustrating one embodiment of a file system 500 of the present invention. The file system 500 comprises an RWFS 410 and the ROFS 405. For example, the file system 500 for the first operating system 105a includes the ROFS 405 and the first RWFS 410a. Similarly, the file system 500 for the second operating system 105b includes the ROFS 405 and the second RWFS 410b. The description of the file system 500 refers to elements of FIGS. 1-4, like numbers referring to like elements.

In one embodiment, the ROFS 405 is compressed. In a certain embodiment, the compressed ROFS 405 comprises archival files. The ROFS 405 may be compressed with the squash file system or Squashfs for a Linux operating system 105.

The RWFS 410 includes at least one pointer 505. The pointer 505 points to the ROFS 405. References to the pointer 505 in the RWFS 410 are forwarded to the ROFS 405. As a result, the RWFS 410 and the ROFS 405 appear to the operating system 105 as a single, private file system.

For example, the first operating system 105a may use the RWFS 410 to organize and manage data written to the memory module 215 and the storage module 265. In addition, the first operating system 105a may use the ROFS 405 to organize and retrieve read-only data organized by the ROFS 405. The second operating system 105b may also use the ROFS 405 to organize and retrieve read-only data organized by the ROFS 405. Both the first operating system 105a and the second operating system 105b share the ROFS 405, while each operating system 105a-b views the ROFS 405 as part of a single, private file system.

Figure 6:
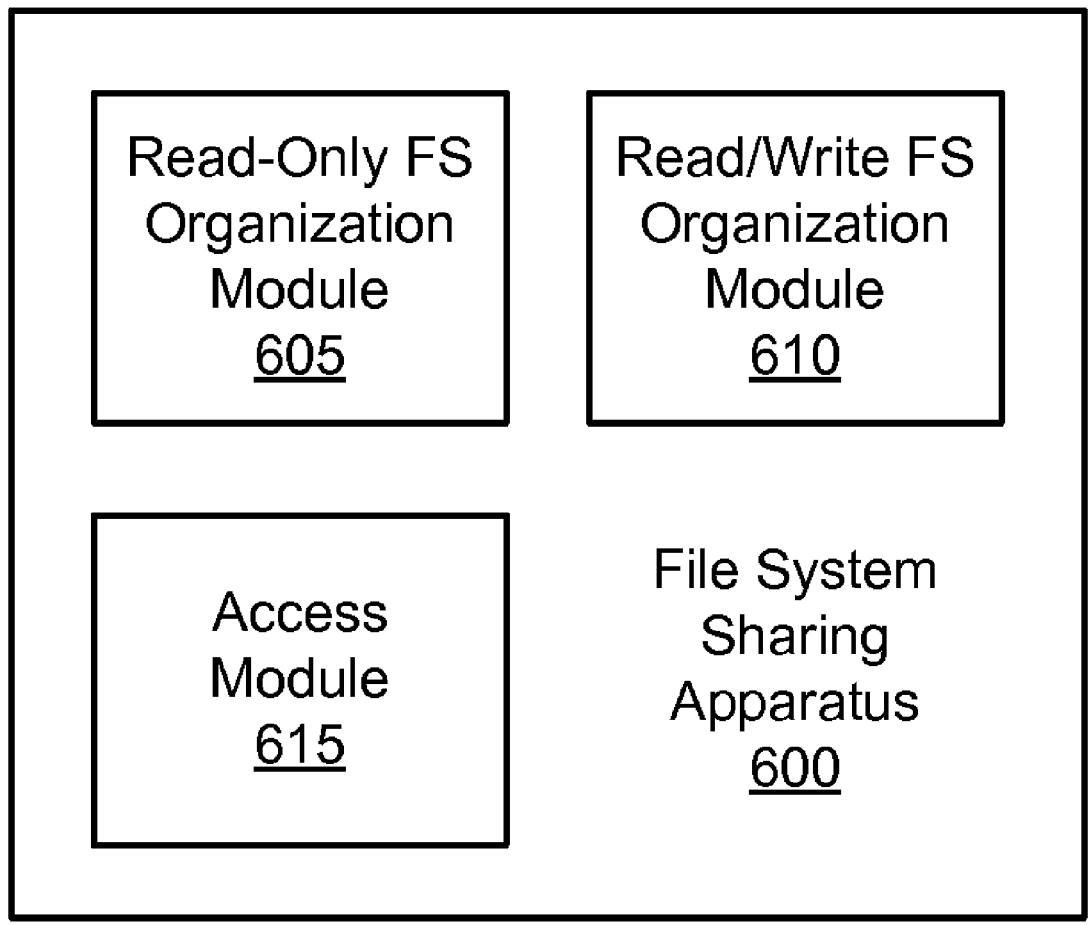
FIG. 6 is a schematic block diagram illustrating one embodiment of a file system sharing apparatus of the present invention.

FIG. 6 is a schematic block diagram illustrating one embodiment of a file system sharing apparatus 600 of the present invention. The apparatus 600 may be embodied in the computer system 100 of FIG. 1. The description of the apparatus 600 refers to elements of FIGS. 1-5, like numbers referring to like elements. The apparatus 600 includes an ROFS organization module 605, an RWFS organization module 610, and an access module 615.

The ROFS organization module 605 organizes the single ROFS 405 for a plurality of operating systems 105. Each operating system 105 executes on a distinct virtual machine 120. Each virtual machine 120 executes on the computer system 100. The ROFS organization module 605 may be configured as a computer program product. The ROFS organization module 605 may be embodied in the hypervisor 110. Alternatively, the ROFS N Ad organization module 605 may be embodied in the BIOS module 240. In a certain embodiment, the ROFS organization module 605 is embodied in an operating system 105 such as a first operating system 105 to load on the computer hardware 115.

The RWFS organization module 610 organizes an RWFS 410 for each operating system 105. In one embodiment, a plurality of RWFS 410 and ROFS 410 pairs each support a different operating system 105. For example, a first RWFS 410 and ROFS 410 pair may support a Linux operating system while a second RWFS 410 and ROFS 410 pair may support a MICROSOFT WINDOWS® operating system. The RWFS organization module 610 may be configured as a computer program product. The RWFS organization module 610 may be embodied in the hypervisor 110. In a certain embodiment, the RWFS organization module 610 is embodied in each operating system 105. Alternatively, the RWFS organization module 610 may be embodied in the BIOS module 240.

The access module 615 accesses the RWFS 410 and ROFS 405 for each operating system 105. The RWFS 410 and ROFS 405 appear to each operating system 105 as a single, private file system. The access module 615 may be configured as a computer program product. In one embodiment, an access module 615 is embodied in each operating system 105. Alternatively, the access module 615 may be embodied in the hypervisor 110.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
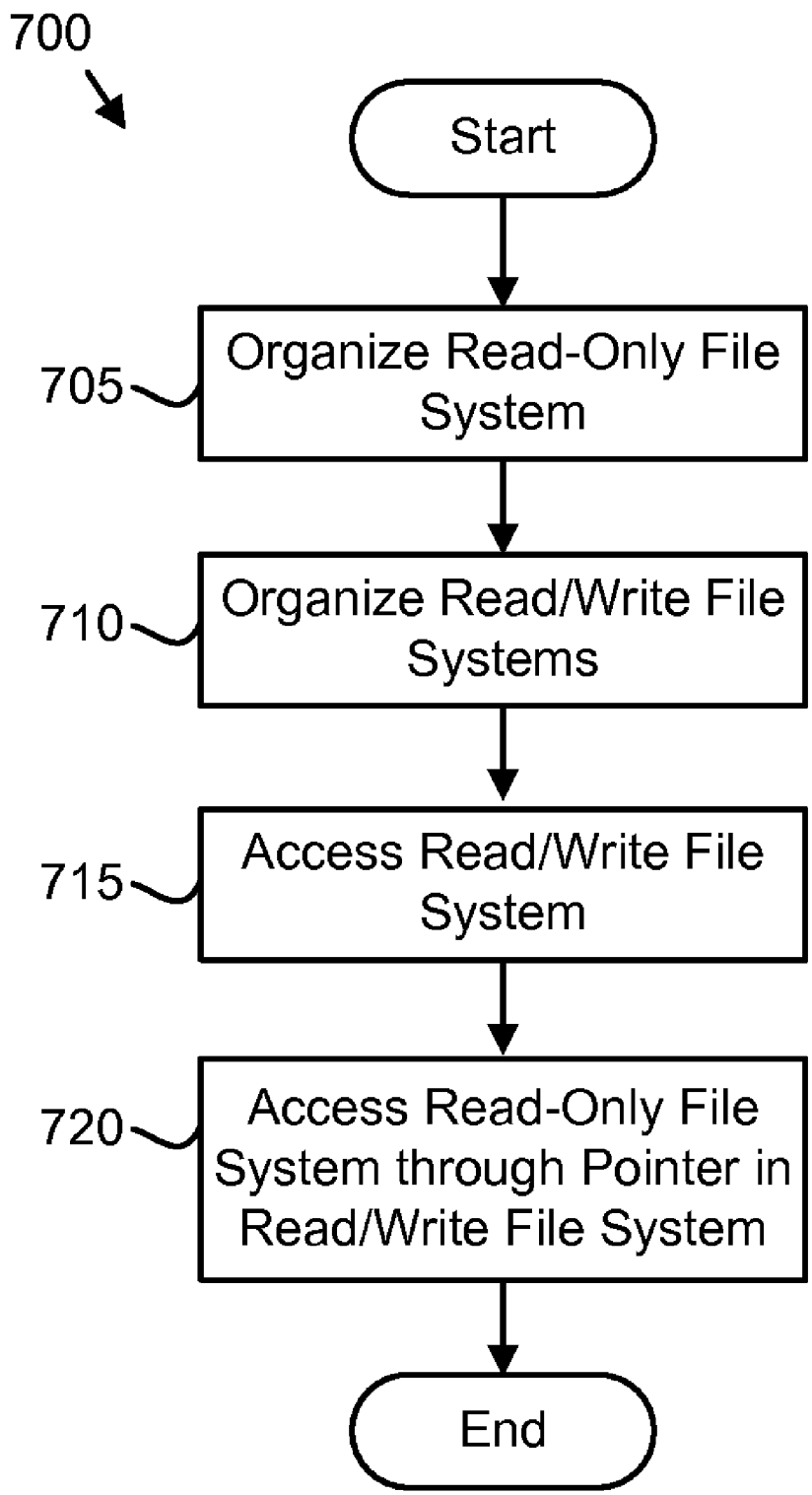
FIG. 7 is a schematic flow chart diagram illustrating one embodiment of a file system sharing method of the present invention.

FIG. 7 is a schematic flow chart diagram illustrating one embodiment of a file system sharing method 700 of the present invention. The method 700 substantially includes the steps to carry out the functions presented above with respect to the operation of the described apparatus and system of FIGS. 1-6. In one embodiment, the method 700 is implemented with a computer program product comprising a tangible storage device having a computer readable program. The computer readable program may be executed by the computer hardware 115.

The method 700 begins, and the ROFS organization module 605 organizes 705 the single ROFS 405 for the plurality of operating systems 105. Each operating system 105 executes on a distinct virtual machine 120. Each virtual machine 120 executes on the computer hardware 115.

In one embodiment, the ROFS organization module 605 organizes 705 a file system of the first operating system 105 to load on the computer hardware 115 as the ROFS 405. For example, the ROFS organization module 605 may be embodied in operating system 105 such as the Linux operating system. The ROFS organization module 605 may organize the ROFS 405 when the operating system 105 is loaded and initialized on the computer hardware 115. In one embodiment, the hypervisor 110 stores a pointer to the ROFS 405.

Alternatively, the ROFS organization module 605 may organize 705 the ROFS 405 while loading an operating system 105. For example, the hypervisor 110 may manage the loading an initialization of the operating system 105. The hypervisor 110 may embody the ROFS organization module 605 and may organize 705 the ROFS 405 for the first operating system 105a. In a certain embodiment, the ROFS organization module 605 organizes 705 the ROFS 405 prior to loading an operating system 105. For example, the ROFS 405 may occupy a memory space distinct from the memory space is occupied by the operating systems 105.

The RWFS organization module 610 organizes 710 an RWFS 410 for each operating system 105. In one embodiment, the RWFS organization module 610 is embodied in the hypervisor 110. The RWFS organization module 610 may modify the image of the operating system 105, replacing the standard file system 320 with the RWFS 410. In addition, the RWFS organization module 610 may include a pointer 505 to the ROFS 405 in each RWFS 410. The pointer 505 may be the pointer stored by the ROFS organization module 605.

In an alternate embodiment, each operating system image comprises an RWFS organization module 610. The RWFS organization module 610 in each operating system 105 may organize 710 the RWFS 410 for the operating system 105 as the operating system 105 is loaded and initialized on the computer hardware 115.

The access module 615 accesses 715 the RWFS 410 for each operating system 105. For example, the access module 615 may be embodied in each operating system 105. The operating system 105 may employ the access module 615 when reading and/or writing the data managed by the RWFS 410.

The access module 615 further accesses 720 the ROFS 405 through the pointer 505 in the RWFS 410 and the method 700 ends. In one embodiment, the pointer 505 is a Linux soft link. An access 720 to the pointer 505 may be automatically redirected to the ROFS 405. In one embodiment, the RWFS 410 includes a plurality of pointers 505. Each pointer 505 may redirect accesses to a specified portion of the ROFS 405.

In one embodiment, the RWFS 410 is configured with pointers 505 for needed portions of the ROFS 405. Thus if the RWFS 410 does not require a portion of the ROFS 405, the RWFS 410 may not include the pointer 505 to the portion.

The RWFS 410 and ROFS 405 appear to each operating system 105 as a single, private file system. For example, the first operating system 105a may view the ROFS 405 and the first RWFS 410a as a single, private file system. In one embodiment, the operating system 105 accesses 715 the RWFS 410 and accesses 720 the ROFS 405 without modification to the operating system image.

Alternatively, the ROFS organization module 605 and/or RWFS organization module 610 may modify the operating system image so that the operating system 105 accesses 715, 720 both the ROFS 405 and the RWFS 410 as a single, private file system. For example, the RWFS organization module 610 may modify addresses within the operating system image so that accesses 720 to the ROFS 405 are directed to the pointer 505.

By sharing the ROFS 405, the operating systems 105 require less memory in the memory module 215. As a result, the computer system 100 may execute the plurality of operating systems 105 as virtual machines 120 with reduced computer hardware requirements.

The present invention shares an ROFS 405 between multiple operating systems 105. In addition, the present invention may reduce the memory requirements for the file systems of the multiple operating systems 105. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a tangible storage device having a computer readable program, wherein the computer readable program when executed on a computer causes the computer to:
   organize one read-only file system for a plurality of operating systems, each operating system executing on a distinct virtual machine, each virtual machine executing on the computer;
   organize a read/write file system for each operating system, each read/write file system comprising at least one pointer to the read-only file system, each read/write file system paired with the read-only file system appearing as a single, private file system to one respective operating system of the plurality of operating system; and
   access each read/write file system directly and the read-only file system through the at least one pointer from each respective operating system.

2. The computer program product of claim 1, wherein the read-only file system is compressed.

3. The computer program product of claim 2, wherein the read-only file system is compressed with a squash file system.

4. The computer program product of claim 1, wherein the pointer is comprises a Linux soft link.

5. The computer program product of claim 1, wherein at least two operating systems share a read-only kernel.

6. The computer program product of claim 1, wherein at least two operating systems are loaded from a same image.

7. The computer program product of claim 1, wherein at least two operating systems are distinct.

8. The computer program product of claim 1, wherein a plurality of read/write file system and read-only file system pairs each support a different operating system.

9. An apparatus comprising:
   a tangible storage device storing computer readable programs;
   a processor executing the computer readable programs, the computer readable programs comprising:
   a read-only file system organization module organizing one read-only file system for a plurality of operating systems, each operating system executing on a distinct virtual machine, each virtual machine executing on a computer;
   a read/write file system organization module organizing a read/write file system for each operating system, each read/write file system comprising at least one pointer to the read-only file system, each read/write file system paired with the read-only file system appearing as a single, private file system to one respective operating system of the plurality of operating system;
   an access module accessing each read/write file system directly and the read-only file system through the at least one pointer from each respective operating system.

10. The apparatus of claim 9, wherein the read-only file system is compressed.

11. The apparatus of claim 10, wherein the read-only file system is compressed with a squash file system.

12. The apparatus of claim 9, wherein the pointer is comprises a Linux soft link.

13. The apparatus of claim 9, wherein at least two operating systems share a read-only kernel.

14. The apparatus of claim 9, wherein at least two operating systems are loaded from a same image.

15. The apparatus of claim 9, wherein at least two operating systems are distinct.

16. A system comprising:
   a memory module storing software instructions and data;
   a processor module executing the software instructions and process the data, the software instructions comprising
      a plurality of virtual machines;
      a plurality of operating systems, each operating system executing on a distinct virtual machine;
      a hypervisor managing the plurality of operating systems;
      a read-only file system organization module organizing a single read-only file system for the operating systems;
      a read/write file system organization module organizing a read/write file system for each operating system, each read/write file system comprising at least one pointer to the read-only file system, each read/write file system paired with the read-only file system appearing as a single, private file system to one respective operating system of the plurality of operating system; and
   the plurality of operating systems, each further comprising an access module accessing the read/write file system directly and through the read-only file system from each respective operating system.

17. The system of claim 16, wherein the read-only file system is compressed.

18. The system of claim 17, wherein the read-only file system is compressed with a squash file system.

19. The system of claim 16, wherein the pointer is comprises a Linux soft link.

20. The system of claim 16, wherein the hypervisor executes under an operating system.

* * * * *